United States Patent
Diehl et al.

(10) Patent No.: US 9,840,581 B2
(45) Date of Patent: Dec. 12, 2017

(54) USE OF POLYESTERS HAVING INHERENT FLAME PROTECTION IN ADHESIVES AND SEALANTS

(71) Applicants: Christina Diehl, Wuppertal (DE); Gabriele Brenner, Duelmen (DE); Bernhard Schleimer, Marl (DE)

(72) Inventors: Christina Diehl, Wuppertal (DE); Gabriele Brenner, Duelmen (DE); Bernhard Schleimer, Marl (DE)

(73) Assignee: Evonik Degussa GmbH, Essen (DE)

( * ) Notice: Subject to any disclaimer, the term of this patent is extended or adjusted under 35 U.S.C. 154(b) by 21 days.

(21) Appl. No.: 14/774,550

(22) PCT Filed: Mar. 6, 2014

(86) PCT No.: PCT/EP2014/054361
§ 371 (c)(1),
(2) Date: Sep. 10, 2015

(87) PCT Pub. No.: WO2014/139858
PCT Pub. Date: Sep. 18, 2014

(65) Prior Publication Data
US 2016/0032045 A1    Feb. 4, 2016

(30) Foreign Application Priority Data

Mar. 15, 2013 (DE) .................. 10 2013 204 550

(51) Int. Cl.
| | | |
|---|---|---|
| *C08G 63/692* | (2006.01) | |
| *C08G 18/76* | (2006.01) | |
| *C09D 175/04* | (2006.01) | |
| *C08G 18/46* | (2006.01) | |
| *C09J 175/06* | (2006.01) | |
| *C08G 63/80* | (2006.01) | |
| *C09D 167/02* | (2006.01) | |
| *C09J 167/02* | (2006.01) | |

(52) U.S. Cl.
CPC ..... *C08G 63/6926* (2013.01); *C08G 18/4684* (2013.01); *C08G 18/7671* (2013.01); *C08G 63/692* (2013.01); *C08G 63/80* (2013.01); *C09D 167/02* (2013.01); *C09D 175/04* (2013.01); *C09J 167/02* (2013.01); *C09J 175/06* (2013.01); *C08G 2170/20* (2013.01); *C08G 2190/00* (2013.01)

(58) Field of Classification Search
CPC ................................................ C08G 63/6926
See application file for complete search history.

(56) References Cited

U.S. PATENT DOCUMENTS

| | | | |
|---|---|---|---|
| 4,314,052 A | | 2/1982 | Engelhardt et al. |
| 7,358,323 B2 * | | 4/2008 | Maeda ........... C08G 63/692 428/364 |
| 8,053,522 B2 | | 11/2011 | Loehden et al. |
| 8,084,136 B2 | | 12/2011 | Loehden et al. |
| 8,163,843 B2 | | 4/2012 | Brenner et al. |
| 8,383,728 B2 | | 2/2013 | Brenner et al. |
| 8,702,899 B2 | | 4/2014 | Spyrou et al. |
| 8,901,231 B2 | | 12/2014 | Brand et al. |
| 2007/0213465 A1 | | 9/2007 | Brand et al. |
| 2010/0105831 A1 | | 4/2010 | Brenner et al. |
| 2011/0082252 A1 | | 4/2011 | Koschabek et al. |

FOREIGN PATENT DOCUMENTS

| | | |
|---|---|---|
| EP | 0 013 564 A1 | 7/1980 |
| JP | 2006-104621 | 4/2006 |

OTHER PUBLICATIONS

English machine translation of Masuda (JP 2006-104621); generated Sep. 17, 2016.*
Yanchuk, et al.: "Formation reaction of phosphorus-containing polyurethanes", retrieved from CHEMABS, XP-002172650, 1981, 1 page.
Loseva, A., et al,"Polycondensation of bis (diethylene glycol) (methylphosphonate with aliphatic dicarboxylic acids)", retrieved from STN, XP-002725111, May 1984, 1 page.
International Search Report dated Jun. 11, 2014 for PCT/EP2014/054361 filed on Mar. 6, 2014.

* cited by examiner

*Primary Examiner* — Michael Pepitone
(74) *Attorney, Agent, or Firm* — Oblon, McClelland, Maier & Neustadt, L.L.P.

(57) ABSTRACT

The present invention relates to the use of polyesters with inherent flame retardancy as or in adhesives, sealants and coatings, to polyesters with inherent flame retardancy and to processes for production thereof.

28 Claims, No Drawings

USE OF POLYESTERS HAVING INHERENT FLAME PROTECTION IN ADHESIVES AND SEALANTS

CROSS REFERENCE TO RELATED APPLICATIONS

This application is a 35 U.S.C. §371 national stage patent application of international patent application PCT/EP2014/054361, filed Mar. 6, 2014, the text of which is incorporated herein by reference, and claims the benefit of the German patent application 10 2013 204 550.6, filed Mar. 15, 2013, the text of which is also incorporated herein by reference.

The present invention relates to the use of polyesters with inherent flame retardancy as or in adhesives, sealants and coatings, to polyesters with inherent flame retardancy and to processes for production thereof.

Hot-melt adhesives represent an important class of adhesive for many applications, for example in automobile construction, in furniture manufacture or in adhesive bonding of textiles. They are solid at room temperature and are melted by heating and applied at elevated temperature to the substrate. On cooling they become hard again and thus provide a secure adhesive bond. Reactive hot-melt adhesives are a subgroup of the hot-melt adhesives and additionally crosslink after application and thus undergo irreversible hardening. Among these are by way of example moisture-curing hot-melt adhesives, which crosslink through reaction with atmospheric moisture.

It is desirable for many applications, in particular in the public sector, to have adequate flame retardancy not only of the substrates but also of the adhesive bond. The usual method of retarding combustion or indeed suppressing it completely is to use flame retardants as formulation constituent. Other substances used alongside mineral substances, such as aluminium hydroxide or antimony oxide, are organic flame retardants, for example those containing halogen, and to an increasing extent, because of relatively low toxicity, phosphorus-containing substances.

The patent EP 1975217 describes flame-retardant adhesives and sealing compositions which comprise a mono- or diphosphinic salt as flame retardant. However, use of a flame retardant as additive generally has an adverse effect on the adhesion properties of an adhesive formulation. The overall adhesive bonding effect is therefore considerably weakened by the use of a flame retardant as additive.

It is an object of the present invention to provide an alternative solution for the introduction of flame retardancy into adhesives or sealants, without thereby impairing adhesive properties or sealing properties.

According to the invention, this object is achieved through the use of flame-retardant polyesters as or in adhesives, sealants and coatings.

Accordingly, the present invention firstly provides the use of polyesters based on di- or polycarboxylic acids and on di- or polyols as adhesives or sealants or as constituent in adhesives, sealants and coatings, where the polyesters comprise at least one diol of the formula (I)

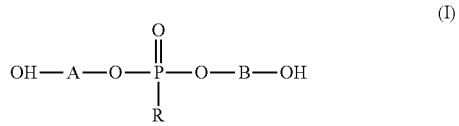

(I)

where R is a saturated linear or branched alkyl moiety having from 1 to 10 C atoms and A and B can be identical or different and are selected from saturated linear or branched alkylene groups having from 1 to 10 C atoms or from mono- or polyalkylene glycol groups.

R is a saturated linear or branched alkyl moiety having from 1 to 10 C atoms, in particular having from 1 to 3 C atoms. Examples of preferred alkyl moieties are methyl groups and ethyl groups.

A and B can be identical or different and can be selected from saturated linear or branched alkylene groups having from 1 to 10 C atoms or from mono- or polyalkylene glycol groups.

In the case of alkylene groups, these are alkylene groups having from 1 to 10 C atoms, preferably having from 1 to 3 C atoms. Examples of preferred alkylene groups are ethylene groups and propylene groups.

In the case of the mono- or polyalkylene glycol groups, these are preferably selected from ethylene glycol groups of the general formula —CH$_2$—CH$_2$(—O—CH$_2$—CH$_2$)$_n$— or from propylene glycol groups of the formula —CH$_2$—CH(CH$_3$)(—O—CH$_2$—CH(CH$_3$))$_n$—, where n is an integer from 1 to 10. Very particular preference is given to di- and trialkylene glycol groups (n=1 or n=2). With particular preference, the diol used of the formula (I) is bis[2-(2-hydroxyethoxy)ethyl]methanephosphonate (n=1).

In respect of the other di- or polycarboxylic acids and di- or polyols of the polyester there are in principle no restrictions, and in principle any mixing ratio can occur. The selection depends on the desired physical properties of the polyester. These can be, at room temperature, amorphous, liquid or (semi)crystalline.

Examples of suitable di- or polycarboxylic acids and derivatives of these are not only aromatic compounds such as dimethyl terephthalate, terephthalic acid, isophthalic acid, naphthalenedicarboxylic acid and phthalic anhydride, but also cyclic and linear aliphatic dicarboxylic acids such as cyclohexanedicarboxylic acid, hexahydrophthalic acid, succinic acid, glutaric acid, adipic acid, sebacic acid, azelaic acid, 1,12-dodecanedicarboxylic acid and 1,14-tetradecanedicarboxylic acid, and also diesters thereof and anhydrides.

For the production of liquid or (semi)crystalline polyesters it is preferable to use aliphatic dicarboxylic acids as di- or polycarboxylic acids. With particular preference, the polyester comprises adipic acid and sebacic acid.

The di- or polyols present in the polyesters used according to the invention can comprise other di- or polyols alongside the diol of the formula (I). The di- or polyols can be aliphatic or cycloaliphatic diols, for example 1,2-ethandiol, 1,3-propanediol, 1,2-propanediol, 1,4-butanediol, 1,5-pentanediol, 1,6-hexanediol, 1,9-nonanediol, 1,12-dodecanediol, methylpropanediol, dicidol, cyclohexanedimethanol or neopentyl glycol. Other possible materials are oligomeric diols such as oligoethylene glycol, oligopropylene glycol and other oligo ethers.

It is also possible to use polyols having more than two functional groups, an example being trimethylolpropane, pentaerythritol or glycerol.

It is moreover possible to use lactones and hydroxycarboxylic acids as mono-, di- or polyols.

It is preferable that no other diols or polyols having ether groups, for example oligoethylene glycol, oligopropylene glycol and other oligoethers, are present alongside the diol of the formula (I) in the polyester used according to the invention. A particularly preferred polyester is composed of adipic acid, 1,6-hexanediol, neopentyl glycol and the diol of the formula (I).

The proportion of the diol of the formula (I) in the polyester is as desired. However, there is usually an ideal proportion at which the phosphorus content is sufficiently high to provide a flame-retardant effect in the adhesive or sealant, but at the same time the physical properties of the polyester are not excessively affected. The phosphorus content of the polyester is therefore preferably from 100 to 20 0000 ppm, very particularly preferably from 5000 to 15 000 ppm. This corresponds to a proportion of the diol of the formula (I) of from 0.1 to 15 mol %, particularly preferably from 4 to 12 mol %, based on the entirety of the di- or polyols in the polyester used according to the invention.

The polyesters are preferably synthesized by way of a melt-condensation process. To this end, the abovementioned di- and/or polycarboxylic acids and di- and/or polyols are provided and melted in a ratio of equivalents of hydroxy to carboxy groups of from 0.5 to 1.5, preferably from 1.0 to 1.3. The polycondensation process takes place in the melt at temperatures of from 150 to 280° C. within from 3 to 30 h. At the start of this process, most of the amount of water liberated is removed by distillation at atmospheric pressure. In the further course of the process, the remaining water of reaction is eliminated, as also are volatile diols, until the desired molecular weight has been achieved. This can optionally be facilitated by using reduced pressure, by enlarging the surface area or by passage of a stream of inert gas. The reaction can also be accelerated by addition of an entrainer and/or of a catalyst before or during the reaction. Examples of suitable entrainers are toluene and xylenes. Typical catalysts are organotitanium compounds or organotin compounds, for example tetrabutyl titanate or dibutyltin oxide. It is also possible to use catalysts based on other metals, e.g. zinc or antimony, or else metal-free esterification catalysts. It is moreover possible to use other additives and operating auxiliaries such as antioxidants or color stabilizers.

The polyesters used according to the invention have hydroxy and/or carboxy end groups, functionality preferably being from 1.0 to 3.0.

The concentration of the hydroxy end groups, determined by titration in accordance with DIN 53240-2, is from 0 to 200 mg KOH/g, preferably from 5 to 50 mg KOH/g.

The concentration of acid end groups, determined in accordance with DIN EN ISO 2114, is from 0 to 50 mg KOH/g, but preferably below 2 mg KOH/g.

The number-average molar mass of the polyesters used according to the invention is from 500 to 30 000 g/mol, preferably from 1000 to 20 000 g/mol. It is determined in accordance with DIN 55672-1 by means of gel permeation chromatography in tetrahydrofuran as eluent and with calibration by polystyrene.

The glass transition temperature of the polyesters according to the invention is in the range from −80° C. to 100° C., preferably from −50° C. to +50° C. It is also possible for there to be one or more melting points and recrystallization points. Thermal properties are determined by the DSC method in accordance with DIN 53765.

The use according to the invention of polyesters comprising diols of the formula (I) introduces flame retardancy into the adhesives and sealants without any adverse effect on the properties of the adhesive bonds or on the sealing properties. This is achieved in that the polyester used according to the invention comprises a phosphorus-containing comonomer which acts as inherent flame retardant, in such a way that subsequent addition of flame retardants as additives to the adhesives or sealants can be omitted. Since a reactive flame retardant is used instead of a flame retardant as additive, there is no adverse effect on the adhesion properties of the resultant adhesive formulation when comparison is made with a formulation that is not flame retardant. The covalent linkage of the flame retardant within the polyesters moreover ensures that these have homogeneous distribution in the adhesives or sealants and cannot migrate, i.e. cannot be extracted by leaching. Longlasting flame retardancy is therefore also ensured.

Adhesives for the use according to the invention can be any type of adhesives known to the person skilled in the art. In particular, the adhesives are hot-melt adhesives (hot melts).

In a preferred embodiment of the present invention, the hot-melt adhesives are thermoplastic hot-melt adhesives which harden entirely by a physical route. For the use in thermoplastic hot-melt adhesives the number-average molar mass is in particular from 10 000 to 30 000 g/mol, preferably from 10 000 to 20 000 g/mol. In these cases the proportion of the diol of the formula (I) is preferably from 4 to 12 mol %, based on the entirety of the di- or polyols of the polyester used according to the invention and mixtures thereof. These small amounts of the diol of the formula (I) are sufficient to ensure effective flame retardancy. The other monomers are selected as desired and depend on the desired physical properties of the polyester.

In another preferred embodiment of the present invention, the hot-melt adhesives are reactive hot-melt adhesives (RHM) which also crosslink chemically, and preference is in particular given here to moisture-curing hot-melt adhesives.

For the use in reactive hot-melt adhesives the number-average molar mass of the polyester used according to the invention is preferably from 500 to 10 000 g/mol, with particular preference from 2000 to 8000 g/mol. The proportion of the diol of the formula (I) is as desired and is preferably from 4 to 12 mol %, based on the entirety of the di- or polyols of the polyester used according to the invention and mixtures thereof. This ensures that the amount of the diol of the formula (I) is also sufficient to ensure effective flame retardancy in the presence of the additions and formulation constituents present in reactive hot-melt adhesives.

Moisture-curing hot-melt adhesives are a preferred example of reactive hot-melt adhesives. These are generally reaction products of the polyesters used according to the invention with an excess of polyisocyanates which react with moisture, e.g. atmospheric moisture, after application and lead to additional crosslinking.

The adhesives are easy to produce. When, according to one of the preferred embodiments, other components are used with the polyester used according to the invention, the adhesive is produced in the simplest case through mixing of the mixture and of the additional components. The mixing can take place with or without solvent, preferably without solvent and very particularly preferably in the melt. The mixing can by way of example take place in a stirred container, a kneader or an extruder. The temperature used for the melting process depends on the viscosity of the constituents. It is usually in the range from 80 to 180° C.

The moisture-curing hot-melt adhesives described above can be produced at temperatures of from 50 to 130° C., depending on the viscosity of the respective formulation. When the adhesive is conditioned for a number of hours for purposes of further processing, a recommended storage temperature is <100° C., since a side reaction forming carbodiimides occurs at higher temperatures. This leads to a marked viscosity rise, and also to severe foaming of the formulation.

In particular the moisture-crosslinking hot-melt adhesives also comprise isocyanates and/or polyisocyanates. The OH:NCO ratio of polyester to isocyanate and/or polyisocyanate in the adhesives is generally from 1:1.2 to 1:3, preferably from 1:1.5 to 1:2.5.

The polyisocyanates can be di- and/or polyfunctional, aromatic, aliphatic or/and cycloaliphatic isocyanates, or else carbodiimide-modified isocyanates or isocyanate-terminated prepolymers. Aromatic polyisocyanates are particularly preferred. Examples of polyisocyanates are diphenylmethane 4,4'-diisocyanate, diphenylmethane 2,4'-diisocyanate, tolylene diisocyanate isomers, isophorone diisocyanate, hexamethylene diisocyanate, dicyclohexylmethane 4,4'-diisocyanate and mixtures thereof. Particular materials are diphenylmethane 4,4'-diisocyanate and mixtures of diphenylmethane 4,4'-diisocyanate and diphenylmethane 2,4'-diisocyanate.

In another embodiment, the moisture-crosslinking hot-melt adhesives also comprise organosilanes alongside or instead of the polyisocyanates. The functionalization of the polyesters used according to the invention can be achieved through a stepwise reaction with polyisocyanates to give isocyanate-terminated prepolymers and subsequent reaction with organosilanes or through a reaction with an adduct of polyisocyanates and organosilanes. In the simplest case, the reaction of the polyesters takes place with an isocyanatoalkylsilane in an OH/NCO ratio of from 1:1 to 1:1.5.

Examples of organosilanes are aminopropyltrimethoxysilane, aminopropyltriethoxysilane, N-methylaminopropyltrimethoxysilane, N-cyclohexyl-aminopropyltrimethoxysilane, N-phenylaminopropyltrimethoxysilane, mercaptopropyltrimethoxysilane, mercaptotriethoxysilane.

The proportion of the polyesters used according to the invention in the reactive hot-melt adhesives is from 1 to 99% by weight, and preferably from 5 to 85% by weight.

In preferred embodiments, the reactive hot-melt adhesives also comprise, alongside the polyesters used according to the invention, other polyols, among which are by way of example polyester polyols, polyether polyols and any desired hydroxy-functional components.

The admixed polyester polyols can be liquid or solid, amorphous or (semi)crystalline polyesters of any desired structure with number-average molar masses ($M_n$) of from 1000 g/mol to 30 000 g/mol, preferably from 2000 g/mol to 10 000 g/mol (calculated from the hydroxy number), and it is preferable here to use linear polyester polyols.

The admixed polyether polyols are polyetherdiols and -triols. Examples here are homo- and copolymers of ethylene glycol, propylene glycol and 1,4-butanediol. The number-average molar mass ($M_n$) of the admixed polyether polyols should be in the range from 200 g/mol to 10 000 g/mol, preferably from 400 g/mol to 6000 g/mol.

Examples of any desired hydroxy-functional components are functionalized (H-acidic), thermoplastic polyurethanes (TPU) and/or polyacrylates and/or ethylene-vinyl acetate copolymers (EVA).

The hot-melt adhesives can moreover comprise other additions. These additions can be: unfunctionalized polymers, e.g. thermoplastic polyurethanes (TPU) and/or polyacrylates and/or ethylene-vinyl acetate copolymers (EVA); pigments or fillers, e.g. talc powder, silicon dioxide, titanium dioxide, barium sulphate, calcium carbonate, carbon black or coloured pigments, external flame retardants; tackifiers, e.g. rosins, hydrocarbon resins, phenolic resins, hydrolysis stabilizers, and also antioxidants and auxiliaries.

The present invention equally provides adhesives, sealants and coatings comprising polyesters based on di- or polycarboxylic acids and on di- or polyols, where the polyesters comprise at least one diol of the formula (I)

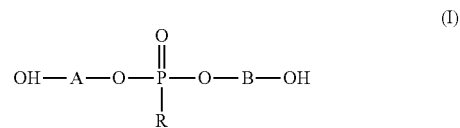

where R is a saturated linear or branched alkyl moiety having from 1 to 10 C atoms and A and B can be identical or different and are selected from saturated linear or branched alkylene groups having from 1 to 10 C atoms or from mono- or polyalkylene glycol groups. As described above, the materials are preferably hot-melt adhesives and with particular preference are moisture-curing hot-melt adhesives.

The adhesives according to the invention are particularly suitable for the production of adhesive bonds. In particular, the hot-melt adhesives according to the invention are suitable for the adhesive bonding of a wide variety of substrates, in particular for the adhesive bonding of metallic substrates, wood, and textiles and very particularly for the adhesive bonding of various plastics. The nature and the extent of the adhesive bonding here are not subject to any limitation. It is preferable that the adhesive bonds are adhesive bonds in the timber and furniture industry (for example assembly bonding, and also the lamination of decorative foils on fibreboard, production of sandwich composites for the manufacture of lightweight panels), in the automobile sector (for example retainer bonds, and also the lamination of foils and textiles on door side parts and roof linings, seat production), in the construction industry, shoe industry and textile industry, and also in window construction (for example for profile sheathing). The adhesives according to the invention are moreover also suitable in the packaging industry and as sealants, and also as coating materials.

The present invention further provides polyesters based on di- and/or polycarboxylic acids and on di- and/or polyols which comprise no ether groups, characterized in that the polyesters comprise at least one diol of the formula (I)

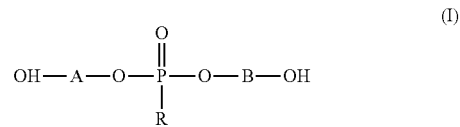

where R is a saturated linear or branched alkyl moiety having from 1 to 10 C atoms and A and B can be identical or different and are selected from saturated linear or branched alkylene groups having from 1 to 10 C atoms or from mono- or polyalkylene glycol groups. It is essential that no other diols or polyols having ether groups are present alongside the diol of the formula (I) in the polyester according to the invention.

R is a saturated linear or branched alkyl moiety having from 1 to 10 C atoms, in particular having from 1 to 3 C atoms. Examples of preferred alkyl moieties are methyl groups and ethyl groups.

A and B can be identical or different and can be selected from saturated linear or branched alkylene groups having from 1 to 10 C atoms or from mono- or polyalkylene glycol groups.

In the case of alkylene groups, these are alkylene groups having from 1 to 10 C atoms, preferably having from 1 to 3 C atoms. Examples of preferred alkylene groups are ethylene groups and propylene groups.

In the case of the mono- or polyalkylene glycol groups, these are preferably selected from ethylene glycol groups of the general formula —$CH_2$—$CH_2$(—O—$CH_2$—$CH_2$)$_n$— or from propylene glycol groups of the formula —$CH_2$—CH($CH_3$)(—O—$CH_2$—CH($CH_3$))$_n$—, where n is an integer from 1 to 4. Very particular preference is given to di- and trialkylene glycol groups (n=1 or n=2).

With particular preference the diol used of the formula (I) is bis[2-(2-hydroxyethoxy)ethyl]methanephosphonate (n=1).

Other mono-, di- or polyols can be present alongside the diol of the formula (I) in the polyesters according to the invention. Any of the aliphatic or cycloaliphatic diols which comprise no ether group is suitable. In contrast, ether-group-containing aliphatic or cycloaliphatic diols are unsuitable. Among these are by way of example diethylene glycol, dipropylene glycol, triethylene glycol, and also oligomeric diols, in particular oligoethylene glycol, oligopropylene glycol and other oligoethers. These diols exhibit, in the presence of a diol of the formula (I), a longer reaction time than the non-ether-group-containing diols during the polycondensation reaction. Another disadvantage of the low-molecular-weight ether-group-containing aliphatic or cycloaliphatic diols is side reactions which occur during the polycondensation in the melt. By way of example, diethylene glycol has a tendency, in particular in the presence of phosphorus-containing compounds, towards cyclization to give the volatile compound dioxane.

However, all non-ether-group-containing aliphatic diols are suitable. Among these are by way of example 1,2-ethanediol, 1,3-propanediol, 1,2-propanediol, 1,4-butanediol, 1,5-pentanediol, 1,6-hexanediol, 1,9-nonanediol, 1,12-dodecanediol, methylpropanediol, dicidol, cyclohexanedimethanol or neopentyl glycol.

It is also possible to use polyols having more than two functional groups, for example trimethylolpropane, pentaerythritol or glycerol. It is moreover possible to use lactones and hydroxycarboxylic acids as mono-, di- or polyols.

The di- or polycarboxylic acids used are in principle not subject to any restrictions, and in principle any mixing ratios can occur.

Examples of suitable di- or polycarboxylic acids and derivatives of these are not only aromatic compounds such as dimethyl terephthalate, terephthalic acid, isophthalic acid, naphthalenedicarboxylic acid and phthalic anhydride, but also cyclic and linear aliphatic dicarboxylic acids such as cyclohexanedicarboxylic acid, hexahydrophthalic acid, succinic acid, glutaric acid, adipic acid, sebacic acid, azelaic acid, 1,12-dodecanedicarboxylic acid and 1,14-tetradecanedicarboxylic acid, and also diesters thereof and anhydrides.

It is preferable to use aliphatic dicarboxylic acids such as adipic acid and/or sebacic acid as di- or polycarboxylic acids.

A particularly preferred polyester is composed of adipic acid, 1,6-hexanediol, neopentyl glycol and the diol of the formula (I).

The application DE 2646218 likewise describes phosphorus-containing polyesters. The phosphorus-containing diol is based on 9,10-dihydro-9-oxa-10-phosphaphenanthrene 10-oxide (DOP), which can be copolymerized with aromatic dicarboxylic acids and with other diols to give flame-retardant polyesters. These polyesters are used in fire-resistant fibres, films or mouldings. The good compatibility of the reactive flame retardant with the polyester is based on the chemical similarity between the structure of the biphenyl derivative DOP and that of aromatic dicarboxylic acids.

In contrast, the present invention provides polyesters which are preferably used in hot-melt adhesives. For the application in the hot-melt adhesives, the physical properties of the polyesters are of great importance. Although the bulky DOP-based diol is used, however, it is often not possible to establish the desired properties of the polyesters, for example low viscosities, high crystallinities or high UV resistance.

Another disadvantage of the DOP-based reactive flame retardants relates to the use in reactive hot-melt adhesives. These are synthesized through the reaction of hydroxy-terminated polyesters with polyisocyanates in the melt. It is known that pentavalent phosphorus compounds catalyze the reaction of polyisocyanates to give carbodiimides. The carbon dioxide liberated during this reaction leads to severe foaming of the formulation. Furthermore, said undesired side reaction leads to a strong orange-red colour, and the formulation crosslinks before synthesis of the adhesive is complete.

The catalytic activity of the phosphorus compounds falls as the number of phosphorus-bonded oxygen atoms rises. The side reaction to give the carbodiimide therefore takes place to a greater extent with phosphinates, such as the DOP-based diol, than with phosphonates, such as the diol of the formula (I): In a reactive hot-melt formulation comprising a polyester made of the DOP-based phosphinate a substantial amount of crosslinking, with foaming, is observed at a temperature of 80° C. with exclusion of moisture, after 24 h. In contrast to this, under identical conditions formulations based on the polyester according to the invention with identical phosphorus content are stable and therefore easier to handle. Another advantage of the phosphorus-containing diol according to formula (I) is that, in comparison with the previously known DOP-based diol, a markedly smaller phosphorus content is sufficient to achieve adequate flame retardancy in the adhesive or sealant.

DE 2900686 describes phosphorus-containing polyesters as equalization aids. The polyesters described preferably comprise ether-group-containing diols alongside the diol of the formula (I). They are therefore water-soluble and therefore unsuitable for the use as adhesive for the production of the long-life materials. The term water-soluble means that 20% aqueous solutions of the described polyesters neutralized with NaOH exhibit no clouding.

In contrast, the polyesters according to the invention are not soluble in water, since no ether-group-containing diols are used except for the diol of the formula (I). They therefore have better suitability for the application in hot-melt adhesives.

The polyesters according to the invention overcome the abovementioned disadvantages of the prior art, and are therefore particularly suitable as or in adhesives, in particular in hot-melt adhesives, preference being given here in particular to reactive hot-melt adhesives.

Even in the absence of any further information, it is assumed that a person skilled in the art can make comprehensive use of the description above. The preferred embodiments and examples are therefore to be interpreted merely as descriptive, and certainly not as in any way limiting disclosure.

The present invention is explained in more detail below with reference to examples. Alternative embodiments of the present invention are obtainable analogously.

EXAMPLES

Example 1

Not According to the Invention

Production of Polyester P1:

951 g of adipic acid (6.51 mol) are melted together with 378 g of neopentyl glycol and 429 g of 1,6-hexanediol (in each case 3.63 mol) under nitrogen in a flask with distillation head. At a temperature of 240° C., most of the water of reaction is removed by distillation within about 4 to 6 hours. 0.15 g (0.01 percent by weight) of a titanium catalyst is then added, and the pressure in the apparatus is lowered in stages as far as 10 mbar. Once the desired hydroxy number range and acid number range were reached, the reaction was ended.

The hydroxy number of the polyester P1 is 40 mg KOH/g, measured in accordance with DIN 53240-2, and its acid number is 1 mg KOH/g, measured in accordance with DIN EN ISO 2114.

Example 2

Inventive

Production of Polyester 2:

913 g of adipic acid (6.25 mol) are melted together with 349 g of neopentyl glycol and 396 g of 1,6-hexanediol (in each case 3.36 mol) under nitrogen in a flask with distillation head. 109 g (0.43 mol) of Exolit OP 560 (Clariant, according to formula I, where R=$CH_3$, A, B=oligoethylene glycol) are added as additional comonomer.

This corresponds to 0.9% by weight phosphorus content, based on the polyester. The conduct of the reaction is analogous to that of Example 1. Once the desired hydroxy number range and acid number range were reached, the reaction was ended.

The incorporation of the reactive flame retardant into the polyester chain can be demonstrated by means of $^{31}P$ phosphorus NMR. The signal at 33 ppm is split by the covalent bonding to the polyester and has a slight shift towards high field. The hydroxy number of the polyester P2 is 40 mg KOH/g, measured in accordance with DIN 53240-2, and its acid number is 1 mg KOH/g, measured in accordance with DIN EN ISO 2114.

Application as Adhesive:

Production of Moisture-Curing Hot-Melt Adhesives

RHM Example 1

Not According to the Invention 250 g of the polyester P1 are melted in a 500 ml flask with flat round flange and dried in vacuo at 130° C. 49 g of diphenylmethane 4,4'-diisocyanate (MDI), corresponding to an OH/NCO ratio of 1/2.2, are then added and quickly homogenized. The mixture is stirred under inert gas at 130° C. for 45 minutes to give complete reaction of the reactants. The moisture-curing hot-melt adhesive is then discharged.

RHM Example 2

Not According to the Invention 250 g of the polyester P1 are melted in a 500 ml flask with flat round flange. After addition of 34 g of bisphenol A bis(diphenyl phosphate), the mixture is dried in vacuo at 130° C. 49 g of diphenylmethane 4,4'-diisocyanate (MDI), corresponding to an OH/NCO ratio of 1/2.2, are then added and quickly homogenized. The mixture is stirred under inert gas at 130° C. for 45 minutes to give complete reaction of the reactants. The moisture-curing hot-melt adhesive is then discharged. Addition of a phosphorus-containing flame retardant as additive, for example bisphenol A bis(diphenyl phosphate), can give 1% by weight phosphorus content in the formulation.

RHM Example 3

According to the Invention

The production process takes place by analogy with RHM Example 1 with polyester 2 instead of polyester 1.

Characterization:

a) Flame Retardancy:

Flame retardancy properties are determined in accordance with the test standard UL 94 on test specimens made of a hardened RHM film of thickness from 0.5 to 1 mm. Hardening was achieved in a cabinet under controlled conditions of temperature and humidity within 7 days at 20° C. and 65% relative humidity.

Results:

RHM 1 exhibits no flame retardancy properties.

Burning drops ignite a cotton pad located under the specimen, the corresponding vertical flame retardancy classification being V-2.

RHM 2 and RHM 3 are least flammable and achieve the highest classification V-0.

b) Adhesive Properties:

Adhesive properties were determined on various substrates in accordance with the DIN EN 1465 method after a hardening time of 7 days at 20° C. and 65% relative humidity.

TABLE 1

| | Tensile shear strength in N/mm$^2$ | | |
|---|---|---|---|
| | ABS | PET | PVC |
| RHM 1 | 7 | 7 | 12 |
| RHM 2 | 6 | 3 | 6 |
| RHM 3 | 10 | 6 | 12 | c) Migration Resistance:

In order to determine migration resistance, the percentage loss of mass was determined after 11 hours of extraction of the hardened reactive hot-melt adhesive in boiling acetone.

The loss of mass is 11% for RHM 1, 22% for RHM 2 and 13% for RHM 3.

The examples show that addition of a phosphorus-containing flame retardant as additive improves flame retardancy in comparison with a formulation without flame retardant. However, adhesive properties in relation to various substrates are drastically impaired. The relatively high loss of mass indicates that the flame retardant additive is leached out of the adhesive and can migrate.

The use of polyesters with inherent flame retardancy in hot-melt adhesives ensures adequate flame retardancy, and also ensures adhesive properties that are comparable with those of conventional, non-flame-retardant formulations. The loss of mass is also comparable. This shows that the reactive flame retardant has covalent bonding to the polyester chains, and cannot migrate.

The invention claimed is:

1. A process for making a flame-retardant hot-melt adhesive, the process comprising
mixing a mixture comprising a flame-retardant polyester to obtain the flame-retardant hot-melt adhesive,
wherein:
the flame-retardant polyester is formed from adipic acid, 1,6-hexanediol, neopentyl glycol, and a diol of formula (I):

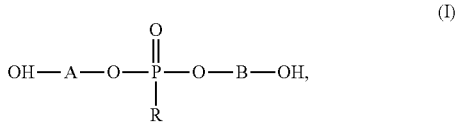

where
R is a saturated linear or branched alkyl moiety having from 1 to 10 C atoms, and
A and B are identical or different and are saturated linear or branched alkylene groups having from 1 to 10 C atoms or are mono- or polyalkylene glycol groups; and
no other diols or polyols having ether groups in addition to the diol of the formula (I) are used to form the flame-retardant polyester.

2. The process of claim 1, wherein the flame-retardant hot-melt adhesive is a reactive hot-melt adhesive.

3. The process of claim 1, wherein A and B are identical or different and are mono- or polyalkylene glycol groups, which are ethylene glycol groups of formula —CH₂—CH₂(—O—CH₂—CH₂)ₙ— or propylene glycol groups of formula —CH₂—CHCH₃(—O—CH₂—CHCH₃)ₙ—, where n is an integer from 1 to 10.

4. The process of claim 1, wherein the diol of the formula (I) is bis[2-(2-hydroxyethoxy) ethyl] methanephosphonate.

5. An adhesive, sealant or coating, comprising
a polyester formed from adipic acid, 1,6-hexanediol, neopentyl glycol, and a diol of formula (I):

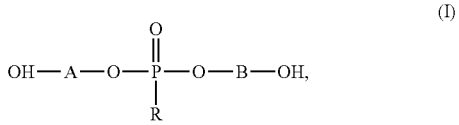

where
R is a saturated linear or branched alkyl moiety having from 1 to 10 C atoms, and
A and B are identical or different and are saturated linear or branched alkylene groups having from 1 to 10 C atoms or are mono- or polyalkylene glycol groups; and
no other diols or polyols having ether groups in addition to the diol of the formula (I) are used to form the polyester.

6. The adhesive, sealant or coating of claim 5, which is a hot-melt adhesive.

7. The adhesive, sealant or coating of claim 6, which is a reactive hot-melt adhesive.

8. A polyester, formed from adipic acid, 1,6-hexanediol, neopentyl glycol, and a diol of formula (I):

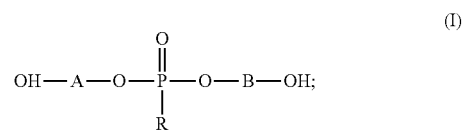

where
R is a saturated linear or branched alkyl moiety having from 1 to 10 C atoms; and
A and B are identical or different and are saturated linear or branched alkylene groups having from 1 to 10 C atoms or are mono- or polyalkylene glycol groups,
wherein no other di- or polycarboxylic acid or a derivative thereof in addition to adipic acid is used to form the polyester.

9. The polyester of claim 8, wherein A and B are identical or different and are mono- or polyalkylene glycol groups, which are ethylene glycol groups of the general formula —CH₂—CH₂(—O—CH₂—CH₂)ₙ— or propylene glycol groups of formula —CH₂—CHCH₃(—O—CH₂—CHCH₃)ₙ—, where n is an integer from 1 to 10.

10. The polyester of claim 8, wherein the diol of the formula (I) is bis[2-(2-hydroxyethoxy)ethyl] methanephosphonate.

11. The process of claim 1, wherein a proportion of the diol of the formula (I) is from 4 to 12 mol % based on an entirety of the di- or polyols in the mixture.

12. The process of claim 1, wherein the mixing takes place in a melt.

13. A process for making a flame-retardant hot-melt adhesive, the process comprising
mixing a mixture comprising a flame-retardant polyester and at least one of an isocyanate and a polyisocyanate to obtain the flame-retardant hot-melt adhesive,
wherein:
the flame-retardant polyester is formed from at least one di- or polycarboxylic acid and at least one di- or polyol;
the flame-retardant polyester is formed from at least one diol of formula (I):

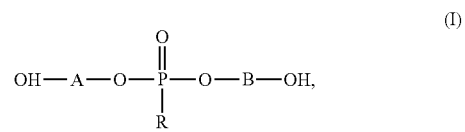

where
R is a saturated linear or branched alkyl moiety having from 1 to 10 C atoms, and
A and B are identical or different and are saturated linear or branched alkylene groups having from 1 to 10 C atoms or are mono- or polyalkylene glycol groups; and
no other diols or polyols having ether groups are present in addition to the diol of the formula (I) in the flame-retardant polyester.

14. The process of claim 13, wherein a ratio of OH:NCO in the mixture is from 1:1.2 to 1:3.

15. A process for making a flame-retardant hot-melt adhesive, the process comprising
mixing a mixture comprising a flame-retardant polyester and an organosilane to obtain the flame-retardant hot-melt adhesive,
wherein:
the flame-retardant polyester is formed from at least one di- or polycarboxylic acid and at least one di- or polyol;
the flame-retardant polyester is formed from at least one diol of formula (I):

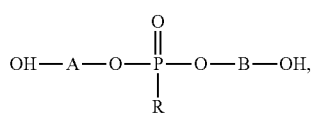
(I)

where
R is a saturated linear or branched alkyl moiety having from 1 to 10 C atoms, and
A and B are identical or different and are saturated linear or branched alkylene groups having from 1 to 10 C atoms or are mono- or polyalkylene glycol groups; and
no other diols or polyols having ether groups are present in addition to the diol of the formula (I) in the flame-retardant polyester.

16. An adhesive, sealant, or coating, comprising
a polyester formed from at least one di- and/or polycarboxylic acid and at least one di- and/or polyol, and
at least one of an isocyanate and a polyisocyanate,
wherein
the polyester is formed from at least one diol of formula (I):

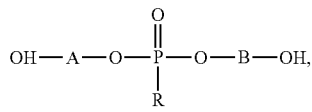
(I)

where
R is a saturated linear or branched alkyl moiety having from 1 to 10 C atoms, and
A and B are identical or different and are saturated linear or branched alkylene groups having from 1 to 10 C atoms or are mono- or polyalkylene glycol groups; and
no other diols or polyols having ether groups are present in addition to the diol of the formula (I) in the polyester.

17. An adhesive, sealant, or coating, comprising:
a polyester formed from at least one di- and/or polycarboxylic acid and at least one di- and/or polyol, and
an organosilane,
wherein
the polyester is formed from at least one dial of formula (I):

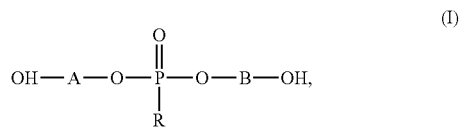

where
R is a saturated linear or branched alkyl moiety having from 1 to 10 C atoms, and
A and B are identical or different and are saturated linear or branched alkylene groups having from 1 to 10 C atoms or are mono- or polyalkylene glycol groups; and
no other diols or polyols having ether groups are present in addition to the diol of the formula (I) in the polyester.

18. The polyester of claim 8, which has a functionality of 1.0 to 3.0.

19. The process of claim 13, wherein the flame-retardant hot-melt adhesive is a reactive hot-melt adhesive.

20. The process of claim 13, wherein A and B are identical or different and are mono- or polyalkylene glycol groups, which are ethylene glycol groups of formula $-CH_2-CH_2(-O-CH_2-CH_2)_n-$ or propylene glycol groups of formula $-CH_2-CHCH_3(-O-CH_2-CHCH_3)_n-$, where n is an integer from 1 to 10.

21. The process of claim 13, wherein the diol of the formula (I) is bis[2-(2-hydroxyethoxy) ethyl] methanephosphonate.

22. The process of claim 15, wherein the flame-retardant hot-melt adhesive is a reactive hot-melt adhesive.

23. The process of claim 15, wherein A and B are identical or different and are mono- or polyalkylene glycol groups, which are ethylene glycol groups of formula $-CH_2-CH_2(-O-CH_2-CH_2)_n-$ or propylene glycol groups of formula $-CH_2-CHCH_3(-O-CH_2-CHCH_3)_n-$, where n is an integer from 1 to 10.

24. The process of claim 15, wherein the diol of the formula (I) is bis[2-(2-hydroxyethoxy) ethyl] methanephosphonate.

25. The adhesive, sealant or coating of claim 16, which is a hot-melt adhesive.

26. The adhesive, sealant or coating of claim 25, which is a reactive hot-melt adhesive.

27. The adhesive, sealant or coating of claim 17, which is a hot-melt adhesive.

28. The adhesive, sealant or coating of claim 27, which is a reactive hot-melt adhesive.

* * * * *